US007998350B2

(12) United States Patent
Flick

(10) Patent No.: US 7,998,350 B2

(45) Date of Patent: Aug. 16, 2011

(54) MAGNETIC TREATMENT DEVICE FOR LIQUIDS INCLUDING A FIGURINE AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 883 days.

(21) Appl. No.: 11/765,787

(22) Filed: Jun. 20, 2007

(65) Prior Publication Data

US 2008/0314813 A1 Dec. 25, 2008

(51) Int. Cl.

| | |
|---|---|
| ***A23L 2/00*** | (2006.01) |
| ***A23L 3/00*** | (2006.01) |
| ***A63H 33/26*** | (2006.01) |
| ***B01D 35/06*** | (2006.01) |
| ***B03C 1/02*** | (2006.01) |

(52) U.S. Cl. ......... 210/695; 210/222; 99/275; 99/277.1; 426/234; 426/237; 426/330.3; 426/330.4; 426/330.5; 446/139

(58) Field of Classification Search .................. 210/222, 210/695; 99/275, 277.1; 426/234, 237, 330.3, 426/330.4, 330.5; 446/139

See application file for complete search history.

(56) References Cited

U.S. PATENT DOCUMENTS

| | | | | |
|---|---|---|---|---|
| 4,197,358 | A * | 4/1980 | Garcia | 428/542.4 |
| 4,872,401 | A | 10/1989 | Lee | 99/275 |
| 5,362,271 | A * | 11/1994 | Butt | 446/139 |
| 5,860,353 | A | 1/1999 | Ceccarani | 99/277.1 |
| 6,287,614 | B1 | 9/2001 | Peiffer | 426/237 |
| 6,325,942 | B1 | 12/2001 | Freije, III | 210/695 |
| 6,390,319 | B1 | 5/2002 | Yu | 220/230 |
| D500,118 | S | 12/2004 | Flick | D23/207 |
| D511,198 | S | 11/2005 | Flick | D23/207 |
| 6,959,640 | B2 | 11/2005 | Flick | 99/277.1 |
| 2007/0108144 | A1 | 5/2007 | Flick | 211/74 |
| 2008/0314253 | A1 * | 12/2008 | Flick | 99/275 |

OTHER PUBLICATIONS

Internet Article: www.officeplayground.com, “Magnetic Art Dolphins”, © 1999-2007 Office Playground, Inc., p. 1.

Internet Article: www.animalden.com, “Magnet: Chocolate Lab”, published by Animal Den © 2007.

* cited by examiner

*Primary Examiner* — David A Reifsnyder

(74) *Attorney, Agent, or Firm* — Allen, Dyer, Doppelt, Milbrath & Gilchrist, P.A. Attorneys at Law

(57) ABSTRACT

A magnetic treatment device for liquid within at least one liquid container may include a figurine having a body portion and at least one limb extending outwardly therefrom. The at least one limb may be positioned adjacent the at least one liquid container. At least one permanent magnet may be carried by the at least one limb to expose the liquid within the at least one liquid container to a magnetic field.

35 Claims, 4 Drawing Sheets

MAGNETIC TREATMENT DEVICE FOR LIQUIDS INCLUDING A FIGURINE AND ASSOCIATED METHODS

FIELD OF INVENTION

The present invention relates to the field of magnetic treatment, and more particularly, to the field of magnetically treating materials to change properties thereof and associated methods.

BACKGROUND OF THE INVENTION

It is recognized that the flavor of some beverages may be enhanced by exposure to a magnetic field, which alters the molecular properties. U.S. Pat. No. 6,287,614 to Peiffer, for example, describes reducing the sensory perception of acids and tannins in alcoholic beverages by treating the beverage with a magnetic field. This treatment is asserted to give the alcoholic beverage a more aged flavor.

Accordingly, a number of products have been developed to expose beverages to magnetic fields to enhance flavor. Some of these products also attempt to enhance user convenience when magnetically treating beverages. For example, U.S. Pat. No. 4,872,401 to Lee discloses a container including surrounding sidewalls that have a plurality of magnets mounted on the inner side of the surrounding sidewalls to improve the flavor of fermented substances, such as wine, sauce, and tobacco. Another example is illustrated in U.S. Pat. No. 6,390,319 to Yu which discloses a beverage magnetizing container that exposes a beverage within the container to a magnetic field to promote preservation. The magnetic field is created by permanent magnets in the sidewalls, base, or cap of the container.

Other products magnetically treat beverages during initial processing. For example, U.S. Pat. No. 6,325,942 to Freije, III discloses a liquid treatment unit that includes a pipe having a plurality of magnets coupled thereto. The magnets treat liquid as it passes through the pipes. U.S. Pat. No. 5,860,353 to Ceccarani discloses an apparatus for accelerating the aging of alcoholic beverages. The apparatus exposes beverages to low-frequency polarized pulsating magnetic fields.

One shortcoming with several of these devices is that the container with its integral magnets must contact the beverage to be treated. In other words, the user must pour the beverage to be treated into the specialized container for treatment prior to consuming the beverage. These specialized containers may increase the cost of magnetically treating beverages and may also decrease consumer flexibility.

Significant advances in the area of magnetically treating materials are disclosed in U.S. Pat. Nos. 6,959,640; D511,198; D500,118; and Published U.S. Patent Application No. 2007/0108144 and assigned to Omega Patents, L.L.C., the assignee of the present invention, the entire contents of which are incorporated herein by reference. The treatment devices may be considered as having a somewhat mechanical appearance that is appealing to a wide range of users. However, other users may desire something similar in terms of effectiveness, yet more fanciful in appearance.

SUMMARY OF THE INVENTION

In view of the foregoing background, it is therefore an object of the present invention to provide a magnetic treatment device for liquids, that is effective yet fanciful in appearance for users.

This and other objects, features, and advantages in accordance with the present invention are provided by a magnetic treatment device for liquid within at least one liquid container comprising a figurine having a body portion, and at least one limb extending outwardly therefrom to be positioned adjacent the at least one liquid container. At least one permanent magnet may be carried by the at least one limb to expose the liquid within the liquid container to a magnetic field. Accordingly, the magnetic treatment device may effectively and efficiently treat the liquid, while the figurine provides an entertaining and fanciful appearance.

The figurine of the magnetic treatment device may comprise a figurine of at least one of a human and a non-human animal. For example, the figurine may comprise a bear, a monkey, an elephant, etc. The at least one limb may have a distal end that carries the at least one permanent magnet.

The at least one limb may include a pair of arms to at least partially encircle the at least one liquid container. The at least one limb may further comprise a pair of legs to at least partially encircle the at least one liquid container.

In some embodiments, the body portion may be vertically oriented to be laterally positioned adjacent the at least one liquid container. In other embodiments, the body portion may be horizontally oriented to be vertically positioned adjacent the at least one liquid container.

The body portion may define a base for receiving the at least one liquid container thereon. Also, a base may support the figurine, and at least one magnet may be carried in the base. In addition, one or more other permanent magnets may be carried by the body portion of the figurine. The at least one permanent magnetic may comprise at least one neodymium magnet, for example.

Another aspect of the invention relates to a method for magnetic treatment of a liquid. The method may include providing a figurine having a body portion and at least one limb extending outwardly therefrom and positioned adjacent the at least one liquid container. At least one permanent magnet may be carried by the at least one limb. The method may also include positioning the at least one liquid container adjacent the figurine to thereby expose the liquid within at least one liquid container to a magnetic field.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notation are used to indicate similar elements in alternate embodiments.

Figure 1:
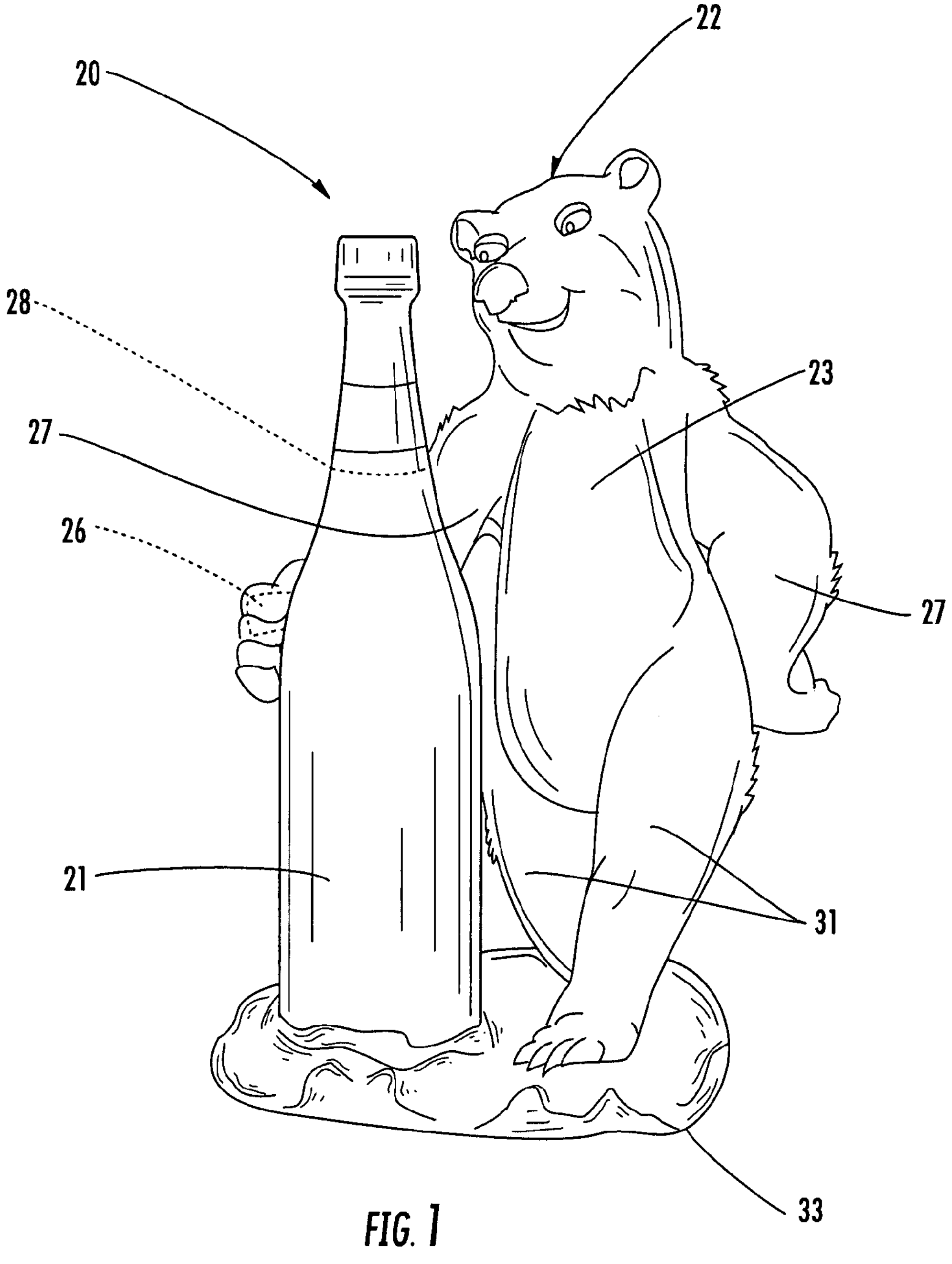
FIG. 1 is a perspective view of a device for magnetically treating liquid in accordance with the present invention.

Referring initially to FIG. 1, an embodiment of a magnetic treatment device 20 for a liquid within a liquid container 21 in accordance with the present invention is now described. The liquid fills the container 21 to the fill level indicated by reference number 28. It will be readily understood by those skilled in the art that the liquid may be a beverage, or an emollient, for example, or any other type of liquid as will be discussed in greater detail below. Additionally, in other embodiments, for example, there may be more than one liquid container 21 that can be treated simultaneously by the same magnetic treatment device 20.

The magnetic treatment device 20 comprises a figurine 22, illustratively of a bear, having a body portion 23 and four limbs, for example, extending outwardly therefrom. In other words, the figurine 22 may be of an animal and impart a fanciful appearance to the device 20 as will be appreciated by those skilled in the art.

The limbs comprise a pair of (hind) legs 31 and a pair of front legs or arms 27, each limb having a distal end. One arm 27 partially encircles the liquid container 21. A permanent magnet 26 is illustratively carried by the distal end of the arm 27 partially encircling the container 21 to expose the liquid within the liquid container 21 to a magnetic field. In this and other embodiments, the limbs could be arranged to treat two or more side-by-side liquid containers, or even liquid containers spaced from each another, as will be appreciated by those skilled in the art.

More than one magnet 26 may be carried by the distal end of the arm 27, or by any limb adjacent the liquid container 21, as will be appreciated by those skilled in the art. The permanent magnet 26 is a preferably a neodymium magnet. Other magnets having similar properties to neodymium may also be used as will be appreciated by those skilled in the art.

The liquid container 21 may, for example, be a plastic container, bottle, or any other non-ferrous container that permits the magnetic field to penetrate therethrough and into the liquid. The device 20 could be sized to accommodate any type of container, as understood by those skilled in the art. In such embodiments, the device 20 could be sized for a standard 12-ounce aluminum can, a wine bottle, a liquor bottle, a juice box, a milk carton, or any other type of beverage container as understood by those skilled in the art. In these embodiments, the device 20 may be used to enhance the flavor of alcoholic beverages, but may also be used to enhance the flavor of citrus juice and dairy products, for example. It will be understood by those skilled in the art that a beverage includes any liquid consumable substance, such as the above-referenced citrus juice, dairy products, and alcoholic beverages as well as sauces and soups, for example.

With respect to magnetically treating a liquid emollient, the characteristics of the emollient that may be changed, for example, include skin absorption and texture, as described in detail in U.S. Pat. No. 6,959,640 assigned to Omega Patents, L.L.C., the assignee of the present invention. An increase in skin absorption of the emollient may include an increase in the rate of skin absorption of the emollient into the skin of the user, for example. Also for example, an increase in skin absorption may include an increase in the amount of emollient that may be absorbed into the skin, as understood by those skilled in the art. Increasing skin absorption advantageously decreases a greasy, or oily, feel of an emollient, which may persist for some time after application, especially for emollients including lanolin.

It will be readily understood by those skilled in the art that an emollient may include any substance applied to the skin or hair for soothing or moisturizing purposes, for example. The emollient may, for example, be in the form of skin lotion, cream, cosmetic lotion, body washes, liquid soaps, cuticle oils, face care products, and hair care products, such as shampoos and conditioners, or any other type of emollient as will be understood by those skilled in the art.

The figurine 22 of the device 20 includes a body portion 32 that is vertically oriented to be laterally positioned adjacent the liquid container 21. A base 33 illustratively supports both the figurine 22 and the liquid container 21. Other embodiments may not include a base 33, and the liquid container 21 may rest on the same surface that the figurine 22 rests on, such as a table-top for example.

Figure 2:
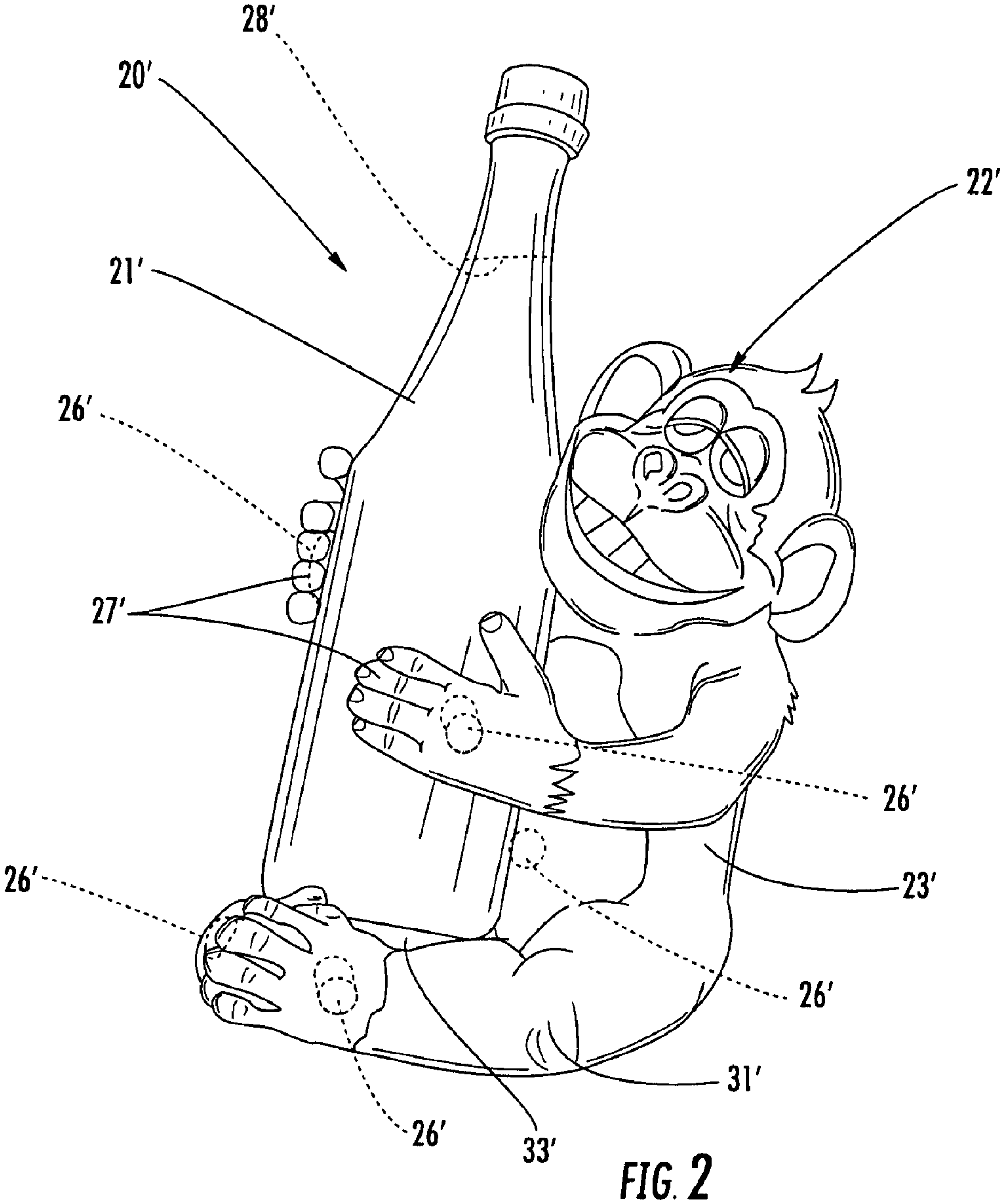
FIG. 2 is a perspective view of yet another embodiment of a device for magnetically treating liquid in accordance with the present invention.

In the embodiment shown in FIG. 2, the figurine 22' is of a sitting monkey, that is, another non-human animal. In other embodiments, the figurine 22' may be of a human or another non-human animal. The limbs include a pair of arms 27' that partially encircle the liquid container 21'. The limbs also comprise a pair of legs 31' that completely encircle the liquid container 21'. In other embodiments, the limbs may comprise one or more arms, legs, or other appendages of the particular animal or human portrayed in the figurine. Of course, a limb may also include an elbow, knee, or any other portion of a limb. A permanent magnet 26' is carried by the distal end of each limb to expose the liquid within the liquid container 21' to a magnetic field. More than one magnet 26' may be carried by the distal end of each limb as will be appreciated by those skilled in the art. The distal end may include a hand, paw, finger, toe, wrist, etc. as will be appreciated by those skilled in the art. In addition, the one or more permanent magnets may be positioned in other parts of the limb than the distal end, as will also be appreciated by those skilled in the art.

Illustratively, another magnet 26' is also carried by the body portion 23' at a location adjacent the liquid container 21. The body portion 23' may include a shoulder, hip, or other body portion. Additional magnets may advantageously be placed throughout body 23' and adjacent the liquid container 21'.

Figure 3:
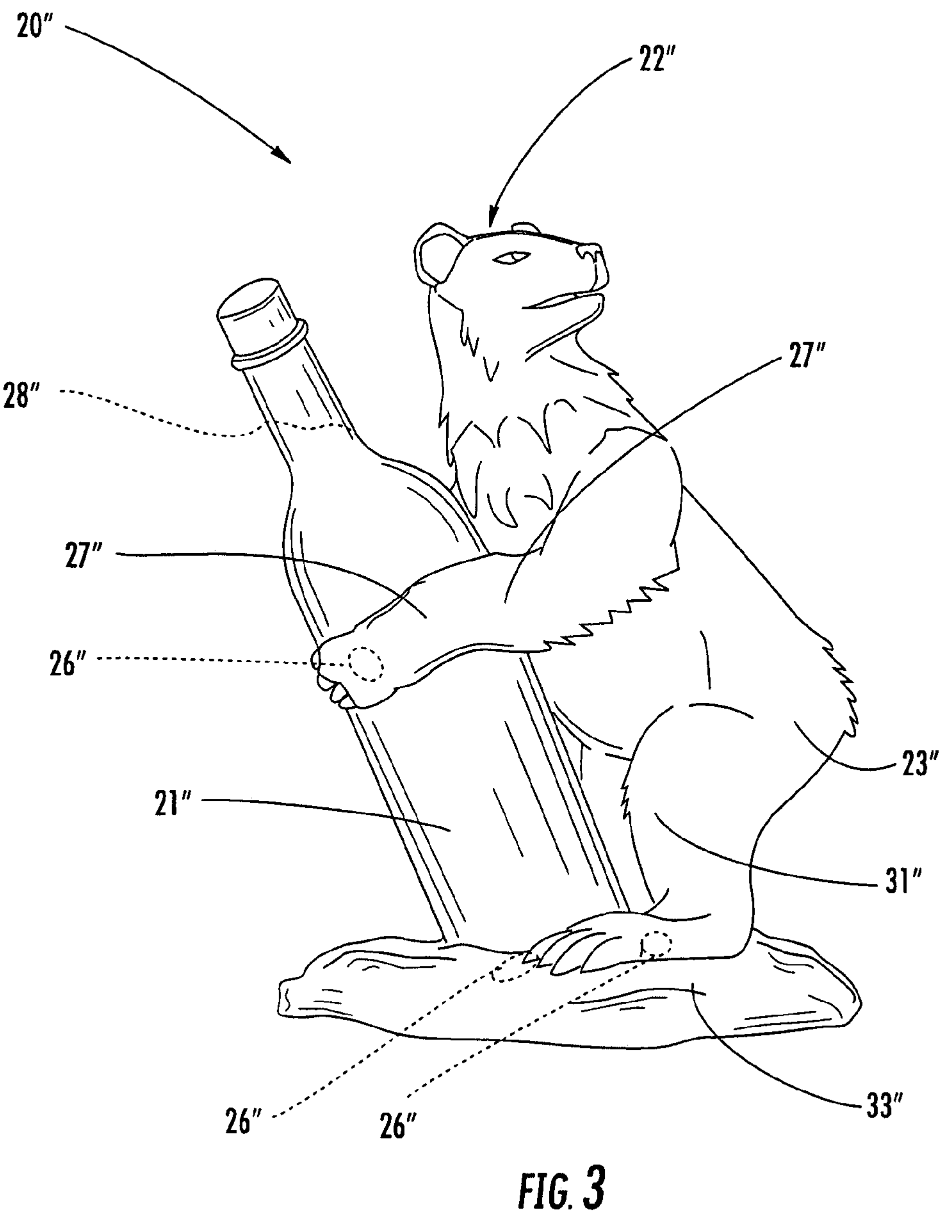
FIG. 3 is a perspective view of yet another embodiment of a device for magnetically treating liquid in accordance with the present invention.

Turning now to FIG. 3, another embodiment of the device 20 is a fanciful figurine 22" of a standing and leaning bear. Illustratively, the figurine 22" includes a pair of arms 27" that encircle the liquid container 21" and a pair of legs 31" that partially encircle the liquid container 21". The arms 27" and legs 31" similarly each have distal ends positioned adjacent the liquid container 21", and a magnet 26" carried in each distal end. A base 33" supports the figurine 22" and the liquid container 21". The base 33" also has a magnet 26'" illustratively carried therein positioned to be adjacent the liquid container 21'" to expose the liquid therein to a magnetic field.

Figure 4:
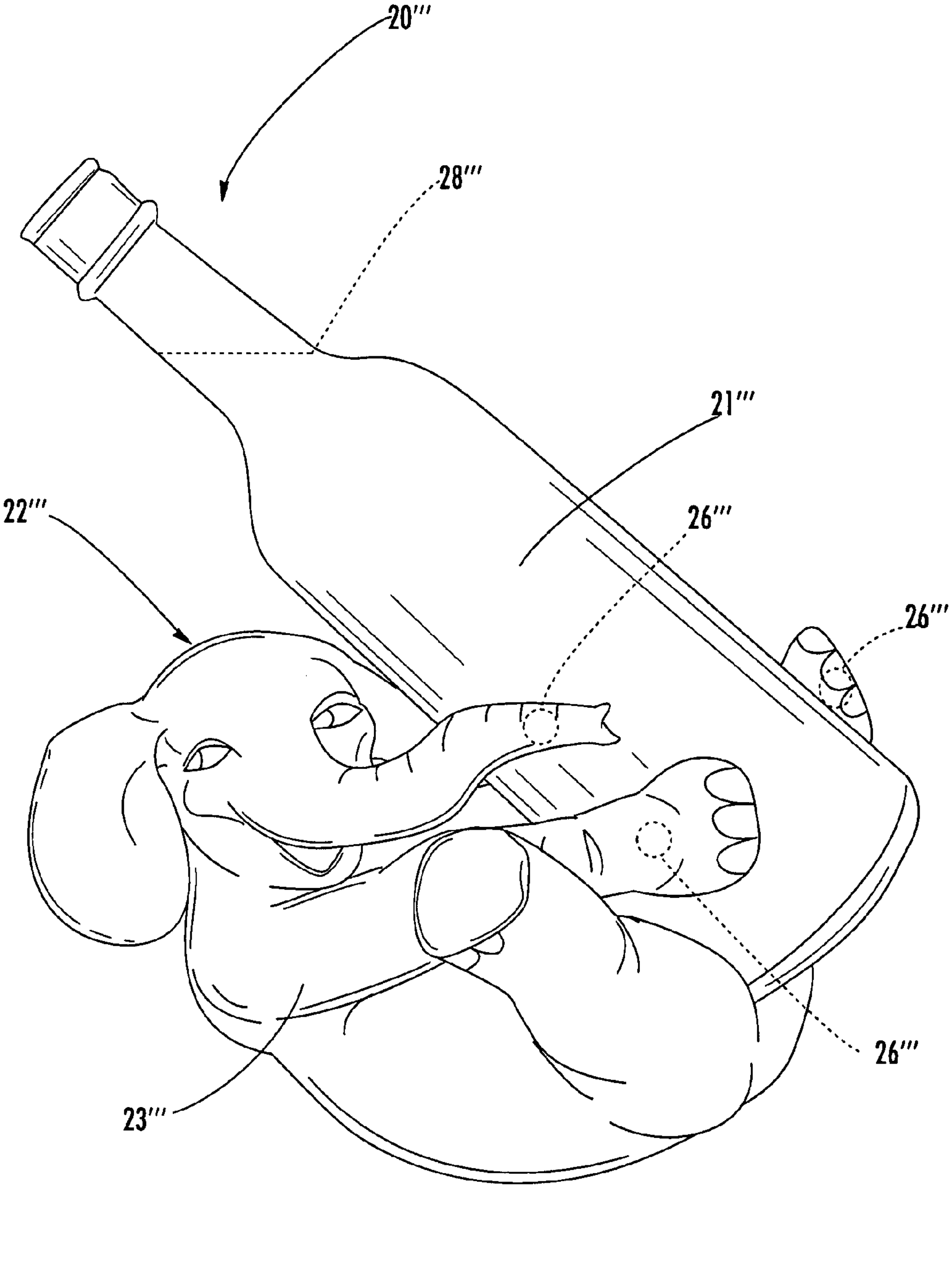
FIG. 4 is a perspective view of yet another embodiment of a device for magnetically treating liquid in accordance with the present invention.

In yet another embodiment of the magnetic treatment device 20'" the figurine 22'" is an elephant as now explained with additional reference to FIG. 4. Illustratively, the elephant figurine 22'" has a body portion 23'" and limbs including two pairs, or four legs 31'", the front pair of legs 31'" partially encircling the liquid container 21'", and the other pair of rear legs 31'" splayed outwardly from the liquid container 21'". Another limb, illustratively a trunk, is similarly positioned adjacent the liquid container 21'" and has a distal end. A permanent magnet 26'" is carried by the distal end of the front legs and the trunk, to expose the liquid within the liquid container 21'" to a magnetic field. In this embodiment, the body portion 32'" illustratively is horizontally oriented to be vertically positioned adjacent the liquid container 21'". In other words, the body portion 32'" defines a base 33'" for receiving the liquid container 21'" thereon.

Referring again to FIG. 1, a method aspect of the invention is directed to magnetic treatment of liquid within a liquid container 21. The method includes providing a figurine 22 having a body portion 23 and at least one limb extending outwardly therefrom. The at least one limb is positioned adjacent the at least one liquid container 21. At least one permanent magnet 26 is carried by the at least one limb. The method also includes positioning the at least one liquid container 21 adjacent the figurine 22 to thereby expose the liquid within the at least one liquid container to a magnetic field.

Many modifications and other embodiments of the invention will come to the mind of one skilled in the art having the benefit of the teachings presented in the foregoing descriptions and the associated drawings. Accordingly, it is understood that the invention is not to be limited to the illustrated embodiments disclosed, and that other modifications and embodiments are intended to be included within the spirit and scope of the appended claims.

That which is claimed is:

1. A magnetic treatment device for liquid within at least one liquid container comprising:

a figurine having a rigid body portion and at least one rigid limb extending outwardly therefrom to be positioned adjacent the at least one liquid container; and at least one permanent magnet carried by said at least one rigid limb to expose the liquid within the at least one liquid container to a magnetic field;

said at least one rigid limb at least partially encircling the at least one liquid container.

2. The magnetic treatment device according to claim 1 wherein said at least one rigid limb comprises a distal end; and wherein said at least one permanent magnet is carried by the distal end of said at least one rigid limb.

3. The magnetic treatment device according to claim 1 wherein said figurine comprises a figurine of at least one of a human and a non-human animal.

4. The magnetic treatment device according to claim 1 wherein said at least one rigid limb comprises a pair of rigid arms.

5. The magnetic treatment device according to claim 4 wherein said at least one rigid limb comprises a pair of rigid legs.

6. The magnetic treatment device according to claim 1 wherein said rigid body portion is vertically oriented to be laterally positioned adjacent the at least one liquid container.

7. The magnetic treatment device according to claim 1 wherein said rigid body portion is horizontally oriented to be vertically positioned adjacent the at least one liquid container.

8. The magnetic treatment device according to claim 7 wherein said rigid body portion defines a base for receiving the at least one liquid container thereon.

9. The magnetic treatment device according to claim 1 comprising a base for supporting said figurine.

10. The magnetic treatment device according to claim 9 further comprising at least one other permanent magnet carried by said base.

11. The magnetic treatment device according to claim 1 wherein said at least one permanent magnet comprises at least one neodymium magnet.

12. The magnetic treatment device according to claim 1 further comprising at least one other permanent magnet carried by said rigid body portion.

13. A magnetic treatment device for liquid within at least one liquid container comprising:

a figurine having a rigid body portion and a pair of rigid arms extending outwardly therefrom to at least partially encircle the at least one liquid container;

said rigid body portion being vertically oriented to be laterally positioned adjacent the at least one liquid container; and at least one permanent magnet carried by each rigid arm to expose the liquid within the at least one liquid container to a magnetic field.

14. The magnetic treatment device according to claim 13 wherein each rigid arm comprises a distal end; and wherein said at least one permanent magnet is carried by the distal end of each rigid arm.

15. The magnetic treatment device according to claim 13 wherein said figurine comprises a figurine of at least one of a human and a non-human animal.

16. The magnetic treatment device according to claim 13 wherein said figurine further comprises a pair of rigid legs extending outwardly from said rigid body portion to at least partially encircle the at least one liquid container.

17. The magnetic treatment device according to claim 13 wherein said at least one permanent magnet comprises at least one neodymium magnet.

18. The magnetic treatment device according to claim 13 further comprising at least one other permanent magnet carried by said rigid body portion.

19. A magnetic treatment device for liquid within at least one liquid container comprising:

a figurine having a rigid body portion defining a base for receiving the at least one liquid container thereon and at least one pair of rigid limbs extending outwardly therefrom to at least partially encircle the at least one liquid container and to be positioned adjacent the at least one liquid container; and at least one permanent magnet carried by said at least one pair of rigid limbs to expose the liquid within the at least one liquid container to a magnetic field.

20. The magnetic treatment device according to claim 19 wherein each rigid limb has a distal end; and wherein said at least one permanent magnet is carried by the distal ends of said at least one pair of rigid limbs.

21. The magnetic treatment device according to claim 19 wherein said figurine comprises a figurine of at least one of a human and a non-human animal.

22. The magnetic treatment device according to claim 19 wherein said at least one pair of rigid limbs comprises a pair of rigid arms.

23. The magnetic treatment device according to claim 19 wherein said at least one pair of rigid limbs further comprises a pair of rigid legs.

24. The magnetic treatment device according to claim 19 wherein said at least one permanent magnet comprises at least one neodymium magnet.

25. The magnetic treatment device according to claim 19 further comprising at least one other permanent magnet carried by said rigid body portion.

26. A method for magnetic treatment of liquid within at least one liquid container comprising:

providing a figurine having a rigid body portion and at least one rigid limb extending outwardly therefrom, the at least one rigid limb being positioned adjacent the at least one liquid container to at least partially encircle the at least one liquid container, and at least one permanent magnet carried by the at least one rigid limb; and positioning the at least one liquid container adjacent the figurine to thereby expose the liquid within the at least one liquid container to a magnetic field.

27. The method according to claim 26 wherein the at least one rigid limb comprises a distal end; and wherein the at least one permanent magnet is carried by the distal end of the at least one rigid limb.

28. The method according to claim 26 wherein the figurine comprises a figurine of at least one of a human and a non-human animal.

29. The method according to claim 26 wherein the at least one rigid limb comprises a pair of rigid arms.

30. The method according to claim 29 wherein the at least one rigid limb further comprises a pair of rigid legs.

31. The method according to claim 26 wherein the rigid body portion is vertically oriented to be laterally positioned adjacent the at least one liquid container.

32. The method according to claim 26 wherein the body portion is horizontally oriented to be vertically positioned adjacent the at least one liquid container.

33. The method according to claim 32 wherein the rigid body portion defines a base for receiving the at least one liquid container thereon.

34. The method according to claim 26 wherein the at least one permanent magnet comprises at least one neodymium magnet.

35. The method according to claim 26 wherein providing comprises providing at least one other permanent magnet carried by the rigid body portion.

* * * * *

UNITED STATES PATENT AND TRADEMARK OFFICE

CERTIFICATE OF CORRECTION

PATENT NO. : 7,998,350 B2
APPLICATION NO. : 11/765787
DATED : August 16, 2011
INVENTOR(S) : Flick et al.

It is certified that error appears in the above-identified patent and that said Letters Patent is hereby corrected as shown below:

| | |
|---|---|
| Column 2, Line 31 | Delete: “magnetic”<br>Insert: --magnet-- |
| Column 3, Line 30 | Delete: “another”<br>Insert: --other-- |
| Column 3, Line 35 | Delete: “a” |

Signed and Sealed this
Seventh Day of February, 2012

David J. Kappos
*Director of the United States Patent and Trademark Office*